US008682677B2

(12) United States Patent
William et al.

(10) Patent No.: US 8,682,677 B2
(45) Date of Patent: *Mar. 25, 2014

(54) SYSTEM AND METHOD FOR AUTOMATICALLY GENERATING A DIALOG MANAGER

(71) Applicant: AT&T Intellectual Property I, L.P., Atlanta, GA (US)

(72) Inventors: Jason William, New York, NY (US); Suhrid Balakrishnan, Westfield, NJ (US); Lihong Li, Santa Clara, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/873,661

(22) Filed: Apr. 30, 2013

(65) Prior Publication Data
US 2013/0238333 A1  Sep. 12, 2013

Related U.S. Application Data

(63) Continuation of application No. 12/627,617, filed on Nov. 30, 2009, now Pat. No. 8,433,578.

(51) Int. Cl.
*G10L 21/00* (2013.01)
*G10L 11/00* (2006.01)

(52) U.S. Cl.
USPC ................................ 704/275; 704/270.1

(58) Field of Classification Search
USPC ............................................ 704/9, 270–275
See application file for complete search history.

(56) References Cited

U.S. PATENT DOCUMENTS

| 7,412,393 B1 | 8/2008 | DeFabbrizio et al. |
| 7,734,471 B2 | 6/2010 | Paek et al. |
| 2010/0063823 A1 | 3/2010 | Wu et al. |

OTHER PUBLICATIONS

Marilyn A. Walker "An Application of Reinforcement Learning to Dialogue Strategy Selection in a Spoken Dialogue System for Email", Journal of Artificial Intelligence Research 12 (2000) 387-416, Submitted Dec. 1999, published Jun. 2000.

Richard S. Sutton "Learning to Predict by the Methods of Temporal Differences", Machine Learning 3:9-44, 1988 ©1988 Kluwer Academic Publishers, Boston—Manufactured in the Netherlands.

Nicholas Roy et al, "Spoken Dialogue Management Using Probabilistic Reasoning", Proceedings of the 38$^{th}$ Annual Meeting of the Association for Computational Linguistics (ACL 2000), Hong Kong, Oct. 2000.

(Continued)

*Primary Examiner* — Samuel G Neway

(57) ABSTRACT

Disclosed herein are systems, methods, and computer-readable storage media for automatically generating a dialog manager for use in a spoken dialog system. A system practicing the method receives a set of user interactions having features, identifies an initial policy, evaluates all of the features in a linear evaluation step of the algorithm to identify a set of most important features, performs a cubic policy improvement step on the identified set of most important features, repeats the previous two steps one or more times, and generates a dialog manager for use in a spoken dialog system based on the resulting policy and/or set of most important features. Evaluating all of the features can include estimating a weight for each feature which indicates how much each feature contributes to at least one of the identified policies. The system can ignore features not in the set of most important features.

17 Claims, 3 Drawing Sheets

(56) References Cited

OTHER PUBLICATIONS

Sridhar Mahadevan et al, "Proto-value Functions: A Laplacian Framework for Learning Representation and Control in Markov Decision Processes", Jul. 17, 2006- Technical Report 2006-35, Department of Computer Science 140 Governors Drive, University of Massachusetts, Amherst, Massachusetts 01003-9324, 67 pages.

Esther Levin et al, "A Stochastic Model of Human-Machine Interaction for Learning Dialog Strategies", IEEE Transactions on Speech and Audio Processing, vol. 8, No. 1, Jan. 2000.

Blaise Thompson et al. "Bayesian Update of Dialogue State for Robust Dialogue Systems", Engineering Department, Cambridge University, CB2 1PZ, UK.

Matthew Frampton et al. "Using Dialogue Acts to Learn Better Repair Strategies For Spoken Dialogue Systems", ICASSP 2008- pp. 5045-5048.

Verena Rieser et al. "Automatic Learning and Evaluation of User-Centered Objective Funcitons for Dialogue Systems Optimisation", School of Informatics, University of Edinburgh, UK- 6 pages.

James Henderson et al. "Hybrid Reinforcements/Supervised Learning of Dialogue Policies from Fixed Data Sets", © 2008 association for Computational Linguistics.

Ronald Parr et al. "Analyzing Feature Generation for Value-Function Approximation", Appearing in Proceedings of the 24th International Conference on Machine Learning, Corvallis, OR, 2007, Copyright 2007 by the author(s)/owner(s).

Michail G. Lagoudakis et al. "Least-Squares Policy Iteration", Journal of Machine Learning Research 4 (2003) 1107-1149, Submitted Aug. 2002, Published Dec. 2003.

Jason D. Williams "The Best of Both Worlds: Unifying Conventional Dialog Systems and POMDPs", AT&T Labs- Research, Shannon Laboratory, 180 Park Ave., Florham Park, NJ 07932, USA.

Jason Williams "Demonstration of a POMDP Voice Dialer", AT&T Labs-Research, Shannon Laboratory, 180 Park Ave., Florham Park, NJ 07932, USA.

Jason D. Williams "Integrating Expert Knowledge Into POMDP Optimization For Spoken Dialog Systems" AT&T Labs-Research, Shannon Laboratory, 180 Park Ave., Florham Park, NJ 07932, USA.

Richard S. Sutton et al. "Reindorcement Learning: An Introduction" A Bradford Book, The MIT Press, 1998 Cambridge, Massachusetts, London, England.

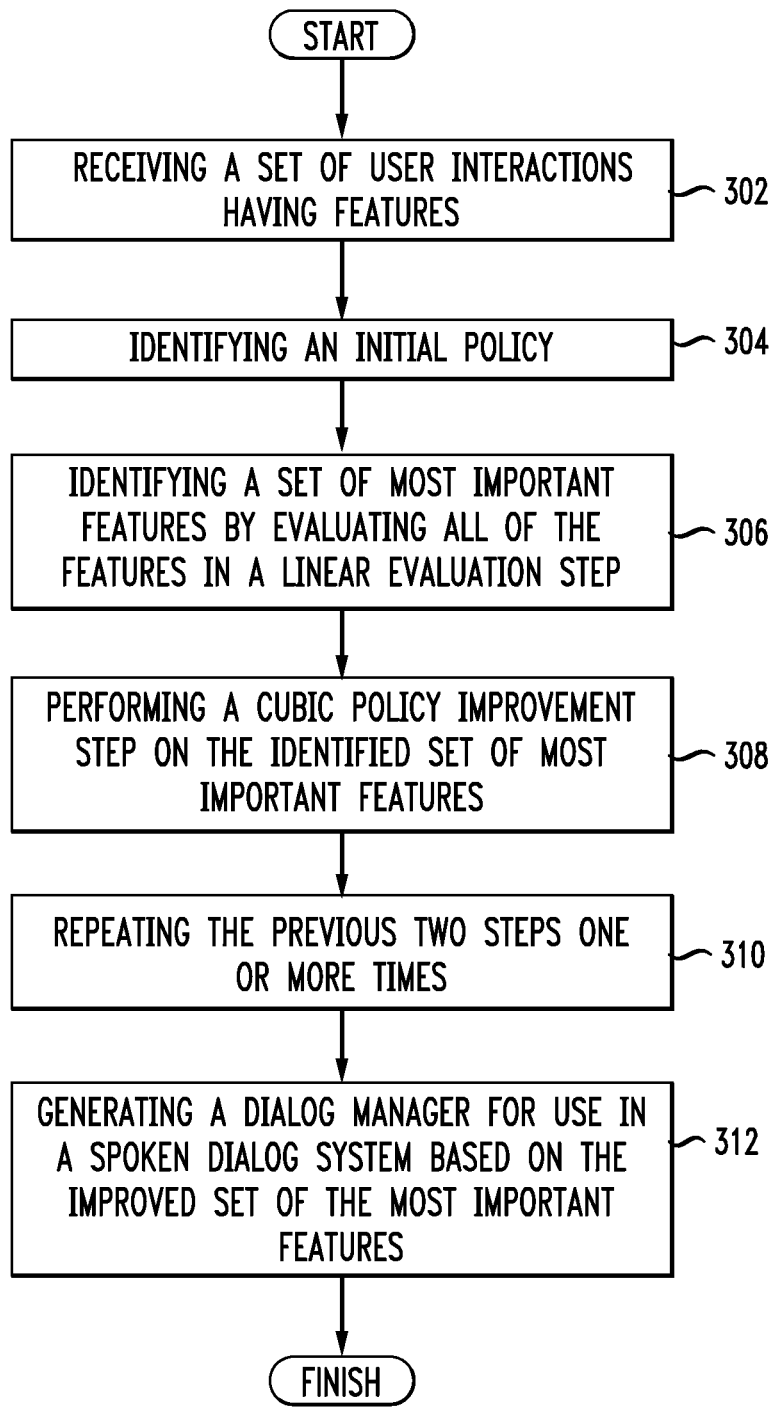

SYSTEM AND METHOD FOR AUTOMATICALLY GENERATING A DIALOG MANAGER

PRIORITY INFORMATION

The present application is a continuation of U.S. patent application Ser. No. 12/627,617, filed Nov. 30, 2009, the contents of which is incorporated herein in its entirety.

BACKGROUND

1. Technical Field

The present disclosure relates to automatic dialog systems and more specifically to a dialog manager that learns automatically.

2. Introduction

Spoken dialog systems help people do something by interacting with them using spoken language. At the core of a spoken dialog system is a dialog manager, which controls the flow of the conversation and decides what to say or do given the current dialog state. In industry, the dialog manager is typically crafted by hand. This is a time-consuming, tedious task in which a human designer must try to divine all the courses a conversation might take. This task is difficult both because people often behave unexpectedly and because speech recognition errors may occur at any time. A manual design process inevitably leads to sub-optimal dialog managers because a human designer cannot feasibly consider all or even most of the conversational paths. While designers have used this approach to build numerous deployed dialog systems, this approach can ignore potentially useful distinctions between dialog states and lead to sub-optimal dialog systems. The consequence for users is longer interactions and more failed dialogs.

A further complication is that once a dialog manager has been deployed, its design is fixed. It does not learn from experience. Only careful monitoring of the system in deployment can catch flaws in the original design. Fixing these flaws requires a long, labor intensive feedback cycle of re-design, re-testing, re-deployment, and more monitoring.

One approach to resolve these problems is to apply reinforcement learning (RL) techniques to automatically assign actions to dialog states. If certain technical assumptions hold, an appropriate RL algorithm can even efficiently and accurately learn an optimal dialog manager. In practice, limits of computational complexity and the size of available dialog corpora typically bound the number of independent states that RL can consider. One solution to this approach is a feature-based representation of the dialog state. The reasoning behind a feature-based approach is that features will enable the dialog manager to generalize even when the number of dialog states is massive.

Learning tractability now depends not on the number of possible dialog states, but on choosing a compact set of useful features about these states. Whereas it is often easy for a designer to suggest a large set of potentially useful features, it is difficult for a designer to ascertain which subsets are actually useful for an RL algorithm. Using too few features ignores useful information which can improve dialog managers. On the other hand, using too many features complicates the learning task and makes learninglearning within the limits of available data and computation time challenging.

In practice a designer can usually suggest many more features than are actually useful. In other words, although some features are useful for learning a dialog manager and others are simply noise, complex interdependencies among the features in learnt policies make it difficult for a person to predict in advance which are useful. Including the noise features can slow or hinder the learning process.

In addition, a learning algorithm should be able to work in both an off-line and on-line setting. In an off-line setting, the learner is given a fixed corpus of interactions, for example logs from an iPhone application. In an on-line setting, the learner is already controlling the dialog manager and its task is to make further improvements on the fly. The needs of off-line and on-line learning are very different, and to date no algorithms have been applied to dialog management which accomplish both of these tasks well.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates an example method embodiment for generating a dialog manager for use in a spoken dialog system.

DETAILED DESCRIPTION

The principles disclosed herein apply to automatically learning or generating a dialog manager. A dialog manager can be part of a spoken dialog system, and decides how to interpret user speech and decides what to say back to the user. This disclosure presents a unified learning technique to at least three inter-related open problems. First, this disclosure is more general than past work in that it can learn equally well from a fixed corpus (such as logs from an iPhone application) or on-line while interacting with users. Second, this disclosure makes use of a learning algorithm that is well-suited to generalizing across dialog situations described by dialog features. Third, this disclosure teaches automatically selecting relevant dialog features for choosing actions, which can substantially simplify dialog manager design.

In one aspect, an RL algorithm automatically selects among a large set of features. It is often relatively easy for a designer to propose a large set of potentially useful features for a given task. The difficulty is deciding on a compact subset which is actually useful. Although several methods exist for feature selection in RL, they are too expensive to be suitable for optimizing a realistic spoken dialog system. The approach disclosed herein is based on least-squares policy iteration (LSPI), a general-purpose RL technique which can be successfully applied to various control and planning problems. LSPI itself has not been applied to dialog management before. First, LSPI can learn either on-policy or off-policy. That is, LSPI can learn either from a corpus generated with some other dialog manager, or learn when it is controlling the dialog. LSPI requires no modification to the reward function, reserving its use for specification of dialog goals. Second, LSPI is sample-efficient, making maximal use of data, meaning that LSPI can learn better policies with less data. This can be important for dialog learning where example interactions are often in short supply. Moreover, LSPI never diverges, and completely avoids learning rate parameters required for other algorithms. Removing hand-generated parameters removes much of the 'art' from crafting a functional RL-based system. This approach adds two tunable parameters: one sets the fraction of the features to retain, and the other is a learning rate.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
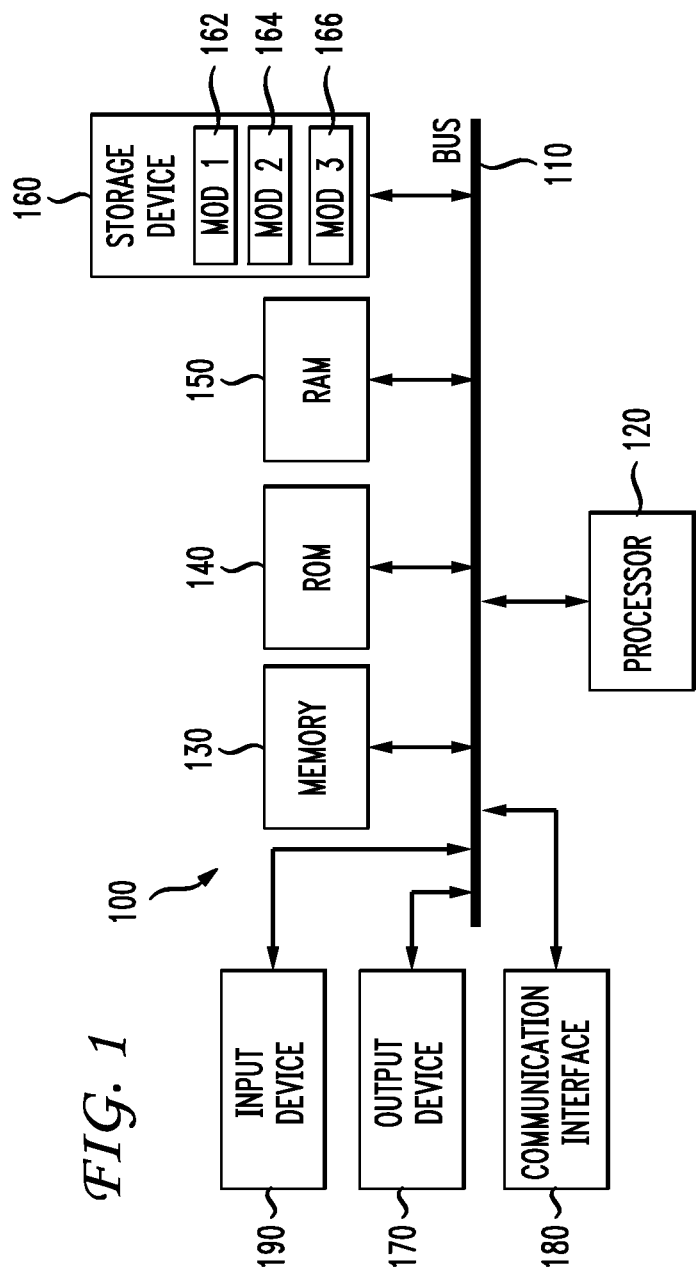
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
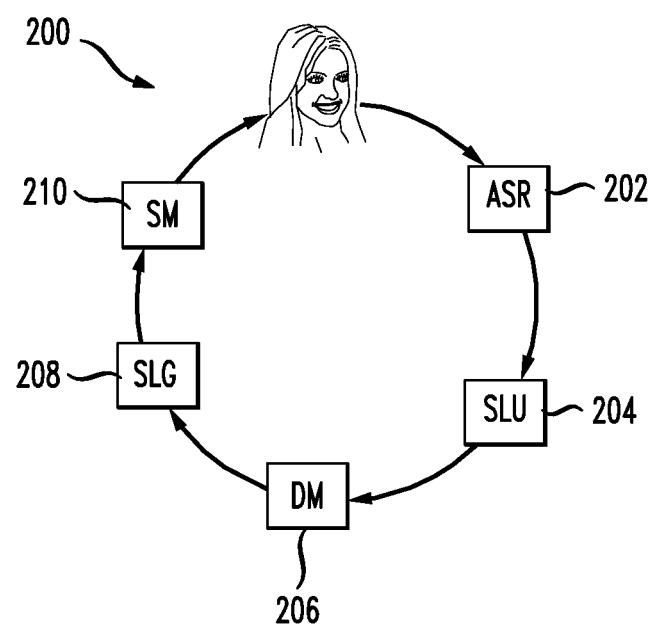
FIG. 2 is a functional block diagram that illustrates an exemplary natural language spoken dialog system.

FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module (SM) 210. The synthesizing module can be any type of speech output module. For example, it can be a module wherein one prerecorded speech segment is selected and played to a user or text to speech system module. Thus, the synthesizing module represents any type of speech output. The present disclosure focuses on innovations related to the DM module 206*b* and can also relate to other components of the dialog system.

The ASR module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." A module for automatically transcribing user speech can join the system at any point or at multiple points in the cycle or can be integrated with any of the modules shown in FIG. 2.

This disclosure includes at least two portions. First, a system 100, such as the one described in FIG. 1, can apply a state-of-the-art reinforcement learning technique called Least-squares policy iteration (LSPI) to dialog management. LSPI has several key strengths. LSPI learns excellent policies using less data than many other techniques, generalizes across features very well, and functions well in both online and off-line settings. The approach set forth herein applies an algorithm such as LSPI to dialog management. Other policy-based algorithms besides LSPI can be used.

The system 100 extends LSPI to automatically select relevant features. Although LSPI works very well with features, it cannot use an arbitrary number of features in practice; LSPI is limited to a few hundred features. Normally, LSPI is an iterative technique for improving the policy. Each iteration involves solving a system of linear equations, an operation which takes computational time cubic in the number of features. In other words, if there were 10 features, each iteration would take on the order of 10 cubed (10*10*10)=1000 units of time. If there were 100 features, each iteration would take on the order of 100 cubed (100*100*100)=1,000,000000 units of time units of time. Because of this cubic growth, in practice the number of features is limited to a few hundred.

Second, the system 100 inserts an additional step between each iteration of LSPI. This additional step rank orders the features by their importance to the current policy. This rank ordering can be done by using an evaluation method such as "Temporal-Difference" (TD). Then, only the most important features as ranked by TD are used in the next iteration of LSPI. This rank ordering can be repeated between each iteration of LSPI, using the current policy, because the features which are most important at early iterations of LSPI may be different than the features which are important at later iterations.

One benefit of this approach is that developers can build dialog systems with higher task completion rates and which engage in faster, more intelligent dialogs that yield higher user satisfaction. This approach can learn or generate a dialog manager using fewer dialogs, which means that fewer users or customers would experience spurious dialogs during the early training stages of use, and system improvements can proceed more quickly. Another benefit of this approach is the ability to make use of more features, specifically the most important features, in order to construct more detailed dialog plans. From the user's perspective, this means more successful dialogs and reduced time per interaction. The expense to the dialog system is a marginal increase in computation.

Both of these benefits increase caller satisfaction in telephone-based dialog systems, where the primary driver of user satisfaction is whether the system understands the user and whether the user accomplishes their goal. The principles disclosed herein tackle this problem directly, increasing how often the user accomplishes their goal successfully.

Having disclosed some basic system components and concepts, the disclosure now turns to the exemplary method embodiment shown in FIG. 3. For the sake of clarity, the method is discussed in terms of an exemplary system 100 such as is shown in FIG. 1 configured to practice the method.

FIG. 3 illustrates an example method embodiment for generating a dialog manager for use in a spoken dialog system. The system 100 receives a set of user interactions having features (302). User interactions can include speech, textual interactions, gestures, exclamations, mouse/keyboard/stylus/pointer input, body language, touchpad interactions, and so forth. User interactions can be multimodal such that the interaction has input components of more than one type. The set of user interactions can be a stored corpus of interactions, previously recorded interactions, and/or real time user interactions.

The system 100 then identifies an initial, starting policy (304). Then the system 100 evaluates all of the features in an inexpensive evaluation step of the algorithm to identify a set of most important features to the current policy (306). This evaluation can be done with the "Temporal Difference" algorithm, also called "TD". The system 100 can also estimate a weight for each feature which indicates how much each feature contributes to the currently identified policy. The system 100 can standardize the features so the weights are comparable. The system 100 then performs the expensive, cubic LSPI improvement step on the identified set of most important features (308). The system 100 can ignore features not in the set of most important features or consider them only as resources become available. For example, if processor cycles or memory are available, the system 100 can devote those available resources to consider in greater depth the most important features or to consider other features which would otherwise go ignored. The system 100 can then repeat steps 306 and 308 to obtain further improvements to the policy (310). Once finished, the system 100 generates a dialog manager for use in a spoken dialog system based on the final set of most important features (312). The system 100 can also incorporate the most important features into a dialog manager.

In one aspect, the approach described herein adopts a standard linear approximation of the value function, $Q(b,a) = \Sigma_{i=1}^{k} w_i \phi_i(b,a)$. The magnitude of a weight w indicates the contribution of its feature $\phi_i(b,a)$ to the value. The system can standardize features so that components in $\phi$ and thus weights w have comparable value ranges.

LSPI assumes a set of m sampled transitions are provided by the equation: $D = \{(b_1,a_1,r_1,b'_1), \ldots, (b_m,a_m,r_m,b'_m)\}$. Starting with an initial weight vector $w_1$, which may or may not be arbitrary, of dimension k, the system improves this vector iteratively until it converges or almost converges.

At iteration $j=1, 2, \ldots$, first, let $Q_j(b,a) = w_j^{tr} \phi(b,a)$ be the current linear Q-function, and $\pi_j(b) = \text{argmax } a \ Q_j(b,a)$ the corresponding greedy policy. Second, obtain $Q_{j+1}(b,a)$ to approximate the Q-function of $\pi_j$: $Q_{j+1}(b,a) = w_{j+1}^{tr} \phi(b,a)$. Here, $w_{j+1}$ solves a system of linear equations, $Aw=c$, where A is a k×k matrix and c a k-vector computed using D by: $A = \Sigma_{l=1}^{m} \phi(b_l,a_l)(\phi(b_l,a_l) - \gamma\phi(b'_l,\pi_j(b'_l)))^{tr}$ and $c = \Sigma_{l=1}^{m} \phi(b_l,a_l) r_l$. The standard RL discount factor $\gamma \in (0,1)$ determines the present value of future rewards, and can be specified by the designer.

If in the second step above, also known as the LSTDQ algorithm, $Q_{j+1}$ computes exactly the Q-function of $\pi_j$, LSPI becomes policy iteration in which $\pi_{j+1}$ is always better than $\pi_j$, and the algorithm converges to an optimal policy. If $Q_{j+1}$ is a sufficiently good approximation LSPI still converges to a near-optimal policy. LSPI in itself is difficult for large feature sets because of the solution to the dense linear system involved in LSTDQ (naively, with time complexity cubic in k). One variant of LSPI disclosed herein can handle many features. First, the magnitudes of weight $w_i$ in w indicate the relative strength of the contribution of $\phi_i$ to Q in a standardized set of features. This approach retains only the features with strong contributions to the value function. The system can choose relevant features based on an approximation of w which yields roughly the same ordering of magnitudes in w. Specifically, the system can approximate w using a gradient-descent-like algorithm known as temporal difference (TD) which has a time complexity linear in k and converges to the same solution as LSTDQ in the limit. TD quickly computes a rough estimate of the weight vector $\hat{w}$, from which the system selects a small subset of features. Then the system uses LSTDQ to compute the expensive but exact weight vector w using this small feature subset. More precisely, the system replaces the second step of LSPI above with the following set of steps.

First, the system initializes $\hat{w}$ to the zero vector and runs TD to go through the samples in D in a single or in multiple passes to obtain $\hat{w}$. The multiple passes can be in serial or in parallel. For the sample $(b_l, a_l, r_l, b'_l)$, the TD update rule is $\hat{w} \leftarrow \hat{w} + \eta d_l \phi^*(b_l,a_l)$, where $\eta \in (0,1)$ is a step size and $d_l = r_l + \gamma \hat{w}^{tr} \phi(b_l, \pi_j(b'_l)) - \hat{w}^{tr} \phi(b_l,a_l)$ is the temporal difference. Second, the system picks k'(<<k) features whose weights in $\hat{w}$ are largest in magnitude. Third, the system runs LSTDQ (step 2 of LSPI) using the k' features to obtain a new weight vector $w_{j+1}$. The system sets the unselected k-k' components in $w_{j-1}$ to 0, while the other k' components are computed by LSTDQ. The parameter k' in effect sets the resolution of the policy. Increasing k' adds resolution at the expense of requiring more training data. The system 100 can determine k' based on available computing resources, desired performance level or responsiveness, desired accuracy, and other factors. In the case of real-time operation of multiple instances using common resources, such as a single server running several instances of a dialog system, the system 100 can allocate additional resources to applications or situations which would perceive a greater benefit from the additional resources. For the step size $\eta$, setting $\eta = 1/k$ can produce reliable results. One property of this approach is that the set of features selected as important may vary from one iteration to the next. As the system estimates Q for longer and longer planning horizons, different mixtures of features may transition in and out of relevance.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
identifying, via a processor, features from a set of user interactions;
identifying a policy for using the features in developing a dialog manager;
performing, based on the policy, a linear evaluation on the features, to yield a set of features;
repeating a cubic policy process on the set of features until the set of features results in a reduced set of features having a quantity below a threshold, the cubic policy process comprising a least-squares policy iteration algorithm; and
generating the dialog manager using a modified set of user interactions, the modified set of user interactions being selected based on the reduced set of features.

2. The method of claim 1, wherein the linear evaluation comprises estimating a weight for each feature in the features.

3. The method of claim 2, wherein the weight of each feature indicates how much each feature contributes to the policy.

4. The method of claim 1, further comprising ignoring, during generation of the dialog manager, features which are not in the reduced set of features.

5. The method of claim 1, wherein the linear evaluation comprises a temporal difference algorithm.

6. The method of claim 1, wherein the set of user interactions is received in real-time.

7. The method of claim 1, wherein application of the cubic policy process becomes cubically more computationally expensive for each feature in the set of features.

8. A system comprising:
a processor; and
a computer-readable storage medium having instructions stored which, when executed by the processor, cause the processor to perform operations comprising:
identifying features from a set of user interactions;
identifying a policy for using the features in developing a dialog manager;
performing, based on the policy, a linear evaluation on the features, to yield a set of features;
repeating a cubic policy process on the set of features until the set of features results in a reduced set of features having a quantity below a threshold, the cubic policy process comprising a least-squares policy iteration algorithm; and
generating the dialog manager using a modified set of user interactions, the modified set of user interactions being selected based on the reduced set of features.

9. The system of claim 8, wherein the linear evaluation comprises estimating a weight for each feature in the features.

10. The system of claim 9, wherein the weight of each feature indicates how much each feature contributes to the policy.

11. The system of claim 8, the computer-readable storage medium having additional instruction stored which result in the operations further comprising ignoring, during generation of the dialog manager, features which are not in the reduced set of features.

12. The system of claim 8, wherein the linear evaluation comprises a temporal difference algorithm.

13. The system of claim 8, wherein the set of user interactions is received in real-time.

14. The system of claim 8, wherein application of the cubic policy process becomes cubically more computationally expensive for each feature in the set of features.

15. A computer-readable storage device having instructions stored which, when executed by a computing device, cause the computing device to perform operations comprising:
identifying features from a set of user interactions;
identifying a policy for using the features in developing a dialog manager;
performing, based on the policy, a linear evaluation on the features, to yield a set of features;
repeating a cubic policy process on the set of features until the set of features results in a reduced set of features having a quantity below a threshold, the cubic policy process comprising a least-squares policy iteration algorithm; and
generating the dialog manager using a modified set of user interactions, the modified set of user interactions being selected based on the reduced set of features.

16. The computer-readable storage device of claim 15, wherein the linear evaluation comprises estimating a weight for each feature in the features.

17. The computer-readable storage device of claim 16, wherein the weight of each feature indicates how much each feature contributes to the policy.

* * * * *